United States Patent [19]

Hoffman et al.

[11] 4,245,341

[45] Jan. 13, 1981

[54] DEVICE FOR TRANSMITTING STOCHASTICALLY CODED INFORMATION

[75] Inventors: Jean-Claude Hoffman; Francis Castanie, both of Toulouse; Henri Crabere, L'Union; Jean-Pierre Verdier, Cazeres; Norbert Voisin, Bruguieres, all of France

[73] Assignee: Societe Nationale Industrielle Aerospatiale, Paris, France

[21] Appl. No.: 956,965

[22] Filed: Nov. 2, 1978

[30] Foreign Application Priority Data

Nov. 9, 1977 [FR] France ............................. 77 33775

[51] Int. Cl.³ .............................................. H04J 3/04
[52] U.S. Cl. ...................................... 370/112; 370/67; 370/92; 370/107
[58] Field of Search ........... 179/15 A, 15 BL, 15 BA, 179/15 BC; 358/258; 370/67, 107, 112, 113

[56] References Cited

U.S. PATENT DOCUMENTS

| 2,719,188 | 9/1955 | Pierce | 179/15 BA |
|---|---|---|---|
| 3,432,619 | 3/1967 | Blasbalg | 179/15 A |
| 3,518,547 | 6/1970 | Filipowsky | 179/15 BC |
| 3,647,977 | 3/1972 | Closs | 179/15 A |
| 4,093,823 | 6/1978 | Chu | 179/15 BA |

Primary Examiner—David L. Stewart
Attorney, Agent, or Firm—Merriam, Marshall & Bicknell

[57] ABSTRACT

The present invention relates to a device for transmitting stochastically coded information, comprising a digital multiplexer and demultiplexer connected by a series transmission line and each controlled by addressing means, the addressing means of the multiplexer and the addressing means of the demultiplexer themselves being controlled by a common random noise generator of probability equal to 0.5.

3 Claims, 2 Drawing Figures

DEVICE FOR TRANSMITTING STOCHASTICALLY CODED INFORMATION

The present invention relates to a device for the transmission of stochastically coded information between two remote points.

It is known that the stochastic coding of analog or digital information x consists in making a discrete random variable X, of which the statistical mean P is equal to x, correspond to this information.

A particular application of the principle is the case of X being binary, formed by 0 and 1 states; in this case, P represents the probability of having 1.

Such a stochastic coding is used in certain calculating and data converting devices, as well as for the transmission of information.

Devices for stochastically coding analog or digital information (or converters) are already known, comprising a comparator having two inputs or sets of inputs, one of which receives said information and the other a random noise of the same nature (i.e. analog or digital) coming from a noise generator. Such a noise generator is constituted by a source of noise such as a resistor, a noise diode, a Zener diode, etc...

Thus, a stochastically coded magnitude is in the form of a sequence of pulses, these pulses being such that their temporal mean is equal to the initial magnitude before coding.

To transmit stochastic information from one point to another, each piece of information is presently transmitted via its own line. Consequently, in the case of a large amount of information to be transmitted, the link comprises as large a number as lines as there are pieces of information, this being expensive and leading to a physically complex link.

It is known that, in the transmission of a plurality of pieces of analog or digital information, in order to avoid a link comprising as many lines as pieces of information to be transmitted, time multiplexing and demultiplexing of said information is used, between the point of transmission and the point of reception of said information. Thus, the information arrives in parallel, is transmitted in series and reconverted into parallel information. The multiplexer and demultiplexer assigned to such a transmission each comprise synchronised addressing means.

It is an object of the invention to allow the transmission of stochastic information by multiplexing.

To this end, according to the invention, the device for the transmission of stochastically coded information is noteworthy in that it comprises a digital multiplexer and demultiplexer connected by a series transmission line and each controlled by addressing means, and in that the addressing means of the multiplexer and the addressing means of the demultiplexer are themselves controlled by a common random noise generator of probability equal to 0.5.

Thus, due to the addressing by the random noise of probability equal to 0.5, every stochastic information is transmitted, in random manner, for a period of time which corresponds to the ratio of the total time allocated to the transmission of said information, divided by the number of pieces of information to be transmitted. If the loss of information which results therefrom is prejudicial to the quality of transmission, this may be at least partly remedied died by increasing the frequency of the random noise generator serving for the stochastic coding of the information, i.e. by increasing the number of the bits representing this information.

The addressing means are preferably shift registers.

The invention will be more readily understood on reading the following description with reference to the accompanying drawings, in which.

Figure 1:
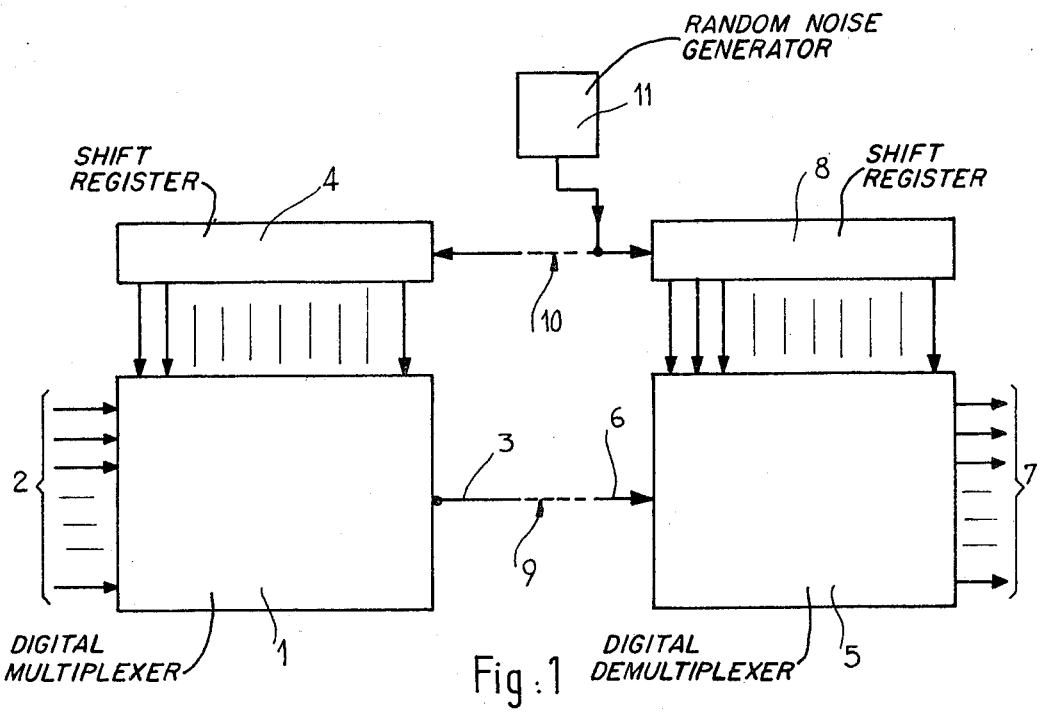
FIG. 1 is a schematic view of a device according to the invention for transmitting stochastically coded information.

Referring now to the drawings, the device for transmitting stochastically coded information, shown in FIG. 1, comprises, on the transmission side, a digital multiplexer 1, provided with a plurality of inputs 2 in parallel and with a single output 3. An addressing device 4 constituted by a shift register is associated with the multiplexer 1.

On the reception side, the device according to the invention comprises a digital demultiplexer 5, provided with a single input 6 and a plurality of outputs 7 in parallel. An addressing device 8 constituted by a shift register, is associated with the demultiplexer 5.

The input 6 of the demultiplexer 5 is connected to the output 3 of the multiplexer 1 by a single link line 9. Similarly, the clock inputs of the shift registers 4 and 8 are connected together by a single clock line 10, itself connected to a random noise generator 11 of probability equal to 0.5. Thus, each of the inputs 2 or the outputs 7 is validated in random and equiprobable manner, the validation of an input 2 always being accompanied by the validation of the same output 7.

Figure 2:
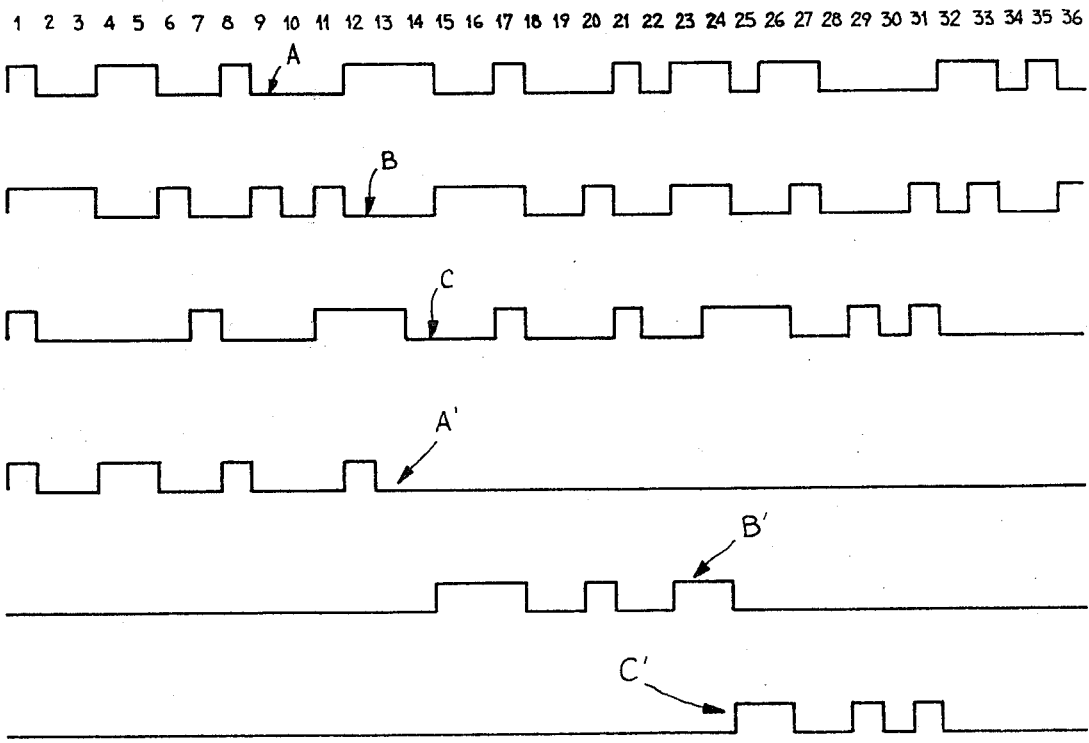
FIG. 2 is a diagram illustrating the functioning of the device of FIG. 1.

The diagrams of FIG. 2 illustrate the functioning of the device of FIG. 1, in the case of three stochastic input signals A,B and C, applied to the inputs 2 of the multiplexer 1 and becoming, respectively, three stochastic output signals A',B' and C', appearing at the outputs 7 of the demultiplexer 5.

In the example in question, the three stochastic signals have values respectively equal to 16/36, 16/36 and 12/36, which are obtained by dividing the number of 1 states of each signal by the maximum number of possibilities of 1 state in this signal.

At the outputs 7 of the demultiplexer 5, the signals A', B' and C' are obtained, each of which corresponds to one third of the transmission time. The signal A' corresponds to the transmission of the signal A during the first third of the transmission time, the signal B' corresponds to the transmission of signal B during the second third of the transmission time and signal C' corresponds to the transmission of signal C during the last third of the transmission time. Of course, although the time multiplexing has been shown in ordered manner, to simplify the specification and drawings, it is obvious that, in fact, this multiplexing is random.

Thus, due to the multiplexed transmission, the amplitudes of the signals A', B' and C' are one third of the amplitudes of the corresponding signals A, B and C, before multiplexing.

The transmission of a stochastic signal by multiplexing followed by a demultiplexing therefore brings about the division of the amplitude of this signal by the number of signals to be transmitted. The drawback may be eliminated by correspondingly increasing the frequency of the random noise generator, serving for coding the analog or digital signals which, once coded, give the signals A,B and C.

In fact, it is known that the stochastic coding of an analog or digital signal may be effected by the introduction of said signal into a comparator which, furthermore, receives a random noise signal. Consequently, by increasing the frequency of the random coding noise, the number of bits representing the information is increased, i.e. a finer coding is obtained.

It will be noted that the link of the information does not necessitate a parity bit and that the information does not have to comprise the information of their own addressing.

If a parasite occurs on the link line 9, only the precision of the signal will be affected thereby. The value of the signal will not be completely false, as might be the case in a transmission of digital information. When the clock line 10 is affected by a parasitic signal, a shift may be produced between the multiplexing and demultiplexing addresses. For example, the signal A will be present on its input 2, whilst the validated output 7 corresponds normally to signal B or C. The signal A' will therefore be present on a different channel from its normal channel. As soon as the parasitic pulse leaves the shift register 4 or 8, the situation becomes normal again. This is effected very rapidly in view of the high operating frequencies of the noise generator 11 (some tens of MHz).

The device according to the invention is therefore suitable for a precise and faithful transmission of information, as is necessary, for example, on board aircraft.

We claim:

1. A device for transmitting stochastically coded information comprising:
   a digital multiplexer with n inputs, each of which is adapted to receive one of n stochastic input signals, and a multiplexer output;
   multiplexer addressing means for controlling the passage of said stochastic input signals between said inputs and said multiplexer output;
   a digital demultiplexer with a demultiplexer input and n outputs, at each of which one of n stochastic output signals appears;
   connecting means between said multiplexer output and said demultiplexer input;
   demultiplexer addressing means for controlling the passage of stochastic signals between said demultiplexer input and said outputs; and
   a first random noise generator with a probability equal to 0.5 simultaneously controlling said multiplexer addressing means and said demultiplexer addressing means, whereby each of said n stochastic output signals has an amplitude which is 1/n times that of the corresponding input signal.

2. A device as claimed in claim 1, wherein the addressing means are shift registers.

3. A device as claimed in claim 1, in which the information to be transmitted is stochastically coded by means of another noise generator, wherein the frequency of this other noise generator is adjusted to compensate for the loss of amplitude of the information, resulting from the transmission.

* * * * *